(12) United States Patent
Gysling

(10) Patent No.: US 12,000,722 B2
(45) Date of Patent: Jun. 4, 2024

(54) CORIOLIS METER

(71) Applicant: Daniel Gysling, South Glastonbury, CT (US)

(72) Inventor: Daniel Gysling, South Glastonbury, CT (US)

(73) Assignee: CorVera LLC, South Glastonbury, CT (US)

( * ) Notice: Subject to any disclaimer, the term of this patent is extended or adjusted under 35 U.S.C. 154(b) by 0 days.

(21) Appl. No.: 17/806,492

(22) Filed: Jun. 12, 2022

(65) Prior Publication Data

US 2022/0307885 A1 Sep. 29, 2022

Related U.S. Application Data

(63) Continuation of application No. 16/946,497, filed on Jun. 24, 2020, now Pat. No. 11,796,366.

(60) Provisional application No. 62/865,445, filed on Jun. 24, 2019.

(51) Int. Cl.
*G01F 1/84* (2006.01)

(52) U.S. Cl.
CPC .......... *G01F 1/8477* (2013.01); *G01F 1/8422* (2013.01); *G01F 1/8431* (2013.01); *G01F 1/849* (2013.01)

(58) Field of Classification Search
CPC ................................................ G01F 1/84–8495
See application file for complete search history.

(56) References Cited

U.S. PATENT DOCUMENTS

| 7,134,320 | B2 * | 11/2006 | Gysling | G01F 25/10 73/32 A |
| 7,152,460 | B2 * | 12/2006 | Gysling | G01F 15/024 73/32 A |
| 7,299,705 | B2 * | 11/2007 | Gysling | G01F 25/10 73/861.354 |
| 2019/0154486 | A1 * | 5/2019 | Zhu | G01F 1/8436 |

* cited by examiner

*Primary Examiner* — Erika J. Villaluna
(74) *Attorney, Agent, or Firm* — Matthew J Patterson

(57) ABSTRACT

In accordance with example embodiments of the present disclosure, a method for determining parameters for, and application of, models that correct for the effects of fluid inhomogeneity and compressibility on the ability of Coriolis meters to accurately measure the mass flow and/or density of a process fluid on a continuous basis is disclosed. Example embodiments mitigate the effect of multiphase fluid conditions on a Coriolis meter.

21 Claims, 18 Drawing Sheets

100

300

CORIOLIS METER

CROSS-REFERENCE TO RELATED APPLICATIONS

This application is a continuation of co-pending U.S. patent application Ser. No. 16/946,497, filed Jun. 24, 2020, which claims priority to U.S. provisional patent application Ser. No. 62/865,445, filed Jun. 24, 2019, both of which are herein incorporated by reference in their entirety.

TECHNICAL FIELD

The present disclosure relates to apparatus or methods for measuring the mass flow and/or density of fluids wherein the fluid flows through the meter in continuous flow and to flow meters and flow measurement, Coriolis meters that employ multiple frequency oscillations and sonar flow measurements.

BACKGROUND

A Coriolis flow meter measures a parameter of a fluid, including but not limited to parameters like the mass flow and/or density of a fluid through a conduit. The same Coriolis meter can measure fluids of varying densities, flow rates, temperatures, phases and viscosity. The mass flow rate is the mass of a fluid moving past a given point per unit time. Volumetric flow rate is the volume of fluid moving past a given point per unit time. Coriolis meters report volumetric flow by dividing the measured mass flow rate by the measured fluid density. Coriolis meters are often used to measure a wide variety of fluids, including liquid and gases and mixtures of the liquid and gases and fluid conveyed solids. Coriolis meters are known as highly accurate mass and density meters for homogeneous fluids and fluids with low compressibility. However, as understood in the art, the accuracy of a Coriolis meter degrades with the introduction of inhomogeneities in the process-fluid and increases in process-fluid compressibility. For example, the introduction of entrained gases within a liquid, and other types of multiphase flows, introduces both inhomogeneities and increases the compressibility, and is known to cause errors in reported mass flow and/or process-fluid density Coriolis meters measure the mass flow and density of the process-fluid by measuring the influence that the process-fluid has on the vibrational characteristics of vibrating, fluid-conveying, flow tubes. The influence of the process-fluid on the vibrational characteristics of the vibrating flow tubes depends on the homogeneity and the compressibility of the process-fluid. For a homogeneous, highly-incompressible fluid being conveyed within a vibrating flow tube the center of mass of the fluid essentially follows the center of mass of the vibrating, fluid-conveying flow tubes. In this case, the mass flow of the process fluid can be calibrated to be essentially proportional to a measured twist, or deformation, of the vibrational mode shape of the flow tube. The density of the process fluid can be calibrated to a change in the natural frequency of the fluid-conveying flow tube.

However, as fluid inhomogeneity and/or compressibility increase, the center-of-mass of the process-fluid increasingly departs from the center-of-mass of the flow tube when vibrated. This departure changes the relationship between said measured vibrational characteristics and said fluid properties, thereby resulting in a Coriolis meter, calibrated on essentially homogeneous, incompressible fluids, to incorrectly interpret the mass flow and/or density of a process-fluid with increased compressibility and/or inhomogeneity. Decoupling of an inhomogeneous fluid is said to occur within a fluid when one phase of a fluid vibrates differently than another phase. Bubbly liquids are an example of a broad class of fluids which can exhibit large and variable amounts of both decoupling due to inhomogeneities.

Sonar flow meters can measure the speed at which sound propagates through a fluid contained in a fluid-conveying conduit. Sonar flow measurement is effective in measuring the speed of sound in wide range of single and multiphase mixtures of gas and liquids, including fluids with conveyed solids. Sonar flow meter are also effective in measuring the speed of sound in bubbly mixtures and utilizing this speed of sound measurement in the determination of gas void fraction of bubbly fluids.

One skilled in the art understands that process fluid variability refers to the inhomogeneity of a fluid or the compressibility of a fluid, or any other fluid variability understood in the art.

Some improvements have been made in the application of Coriolis meters on multiphase flows by measuring the drive gain of tube vibration. The drive gain of a Coriolis meter is a measure of the oscillatory force required to vibrate the fluid-conveying flow tube to a prescribed amplitude. Since the introduction of entrained gases increases the damping of the vibrational mode of the fluid-conveying flow tubes, the drive gain of a Coriolis meter often correlates with the amount of entrained gas. Although this approach is often a reliable indicator of the presence of entrained gas, it does not typically reliably quantify the amount of entrained gas, nor has it been successfully used to correct the errors in the reported mass flow or density measurements due to the entrained gas.

In one example within the state of the art, a dual tube Coriolis meter has flow tubes driven at two different vibrational modes, each with a different frequency. The meter provides a measure of the density of the process fluid by measuring the natural frequency of each of the two modes of the fluid-conveying flow tubes and interpreting the natural frequency in terms of the density of the process-fluid utilizing a calibration determined for an essentially incompressible, homogeneous fluid. In this method, the difference in the measured densities is interpreted as a measure of the influence of the entrained gas present in the process-fluid.[.] This difference in conjunction with the difference in vibrational frequency is used to estimate the density of the liquid without the entrained gas.

The state of the art has yet to effectively quantify the combined effects of decoupling (due to inhomogeneities) and compressibility on the mass flow and/or density of a process-fluid reported by a multifrequency Coriolis meter. As a result, the state of the art exhibits a limited ability to correct for multiphase conditions on multi-frequency Coriolis meters, particularly in combination with varying pressure, gas void fraction and reduced frequency. Furthermore the state of the art multi-frequency Coriolis meters lacks the ability to output gas void fraction as a measured process parameter.

SUMMARY

In accordance with example embodiments of the present disclosure, a method for determining parameters for, and application of, models that correct for the effects of fluid inhomogeneity and compressibility on the ability of Coriolis meters to accurately measure the mass flow and/or density of a process fluid on a continuous basis is disclosed. Example embodiments mitigate the effect of multiphase fluid conditions on a Coriolis meter.

In an example embodiment, at least one measurement of the propagation of the speed of sound through a process fluid is employed to determine the gas volume fraction and employed in the interpretation of vibrational characteristics of at least one conduit. Fluid properties, including, process-fluid density, mass flow rate, gas void fraction and liquid-phase density are interpreted using an empirical model in which parameters of said model are determined using an optimization algorithm. In combination with the measurement of the propagation of the speed of sound through the process-fluid, at least one conduit is vibrated at more than one frequency, or more than one conduits are vibrated at different frequencies. Measurement of the mass flow and/or density through at least one conduit vibrated at more than one frequency, or more than one conduits are vibrated at different frequencies, in combination with the measurement of the speed of sound propagating through the fluid supports an error reducing algorithm that provides continuous error correction in a flowing fluid of varying properties.

The method and apparatus of the disclosure improves the accuracy of multi-frequency Coriolis meters on both homogeneous and non-homogeneous flows. Homogeneous flows include single-phase flows. Moving fluid with entrained gas in which no significant decoupling occurs due to the inhomogeneity of the bubbles can effectively be treated as homogeneous flows. Measured speed of sound combined with the disclosed method may be used to account for compressibility in both homogeneous flows and non-homogeneous flows.

The present disclosure describes a method and apparatus that measures fluid density and mass flow rate with improved accuracy in the presence of varying levels of compressibility and/or inhomogeneity of a fluid flowing through vibrating conduits, also referred to as vibrating flow tubes.

An example embodiment accurately characterizes multiphase flows within a multi-frequency Coriolis meter. The example embodiment is a method for measuring process-fluid mass flow and/or density in a Coriolis meter having one or more flow tubes, with flow tube vibration occurring at at least two different resonant frequencies in combination with a measured sound speed through the process fluid to provide the basis for determination of parameters in a model used to correct for the effects of fluid inhomogeneity and compressibility An optimization algorithm minimizes an error function to interpret the apparent mass flow rate and apparent densities measured at two frequencies in terms of the actual mass flow rate and actual density of a mixture flowing through a Coriolis meter. This error function is based on equating the interpreted mass flow rates at two frequencies and equating the interpreted process fluid densities. For this example, the error function is defined as a weighted sum of the square of the normalized difference in mass flow and densities at the two frequencies, for example:

$$\text{error} = \alpha_m((\dot{m}_{f1_{trial}} - \dot{m}_{f2_{trial}})/(\dot{m}_{f1_{trial}} + \dot{m}_{f2_{trial}}))^2 + \alpha_\rho ((\rho_{f1_{trial}} - \rho_{f2_{trial}})/(\rho_{f1_{trial}} + \rho_{f2_{trial}}))^2$$

In the above expression, the trial mass flows and densities are formed by correcting the measured, or apparent, mass flows and densities to actual mass flows and density using an over reading function determined by a mathematical model which incorporates the effects of process-fluid inhomogeneity and compressibility. The error is minimized by adjusting parameters within the mathematical model such that corrected mass flows and corrected densities predicted at the two frequencies match, respectively. To determine the parameters of the multiphase flow through the meter, the error function is then evaluated over a wide range of reduced frequency parameters; which in this model influences both compressibility and gas void fraction, and the gas damping ratio parameter, also referred to as decoupling parameter. Once the parameters of the model are optimized such that the error function is minimized, f, the optimized mass flow and mixture density are determined by utilizing the optimized parameters in the model to correct the measured process-fluid mass flow and density. One skilled in the art understands that the parameters of a model may be adjusted or optimized. The present disclosure may refer to adjusted or optimized interchangeably.

In another example embodiment, an empirical model for the effects of process fluid inhomogeneity and compressibility formulated by Hemp is used, where ρ measured and $\dot{m}_{measured}$ are the density and mass flow reported by a Coriolis meter operating on a process-fluid, and would be calibrated to accurately represent the density and mass flow if the process fluid was a homogeneous fluid with a sufficiently low, or known, reduced frequency.

ρ liquid and $\dot{m}_{liquid}$ are the actual liquid density and mixture mass flow rate. Note that for gas-entrained mixtures, the mass flow of the gas phase is typically negligible compared to the mass flow of the liquid, and therefore the mixture mass flow and the liquid mass flow rates are essentially identical.

$$\frac{\rho_{meas}}{\rho_{liquid}} = 1 - k_d \varphi_g + G_d(\text{f\_red})^2 \text{ for density}$$

$$\frac{\dot{m}_{meas}}{\dot{m}_{liquid}} = 1 - \frac{(k_m - 1)}{1 - \varphi_g}\varphi_g + G_m(f_{red})^2 \text{ for mass flow}$$

Where $$f_{red} \equiv \frac{2\pi f_{tube} \frac{D}{2}}{a_{mix}}$$

the reduced frequency, $f_{tube}$ is the vibrational frequency of flow tube (in Hz) D is the inner flow diameter of said flow tube, and $a_{mix}$ is the mixture speed of sound.

Gd and Gm are compressibility parameters for the density and mass flow errors, respectively, and Kd and Km are decoupling parameters for the density and the mass flow error, respectively, and $\alpha_g$ is the gas void fraction.

Hemp's formulation provides a compact parametric model for correcting for the effects of inhomogeneity and compressibility on the mass flow and the density as reported by a Coriolis meter, calibrated on homogeneous process fluids operating at low reduced frequencies, but operating on process fluids with inhomogeneity and/or significant compressibility. Hemp's formulation also provides a model that explicitly identifies the role of the gas void fraction, $\alpha_g$, in quantifying decoupling effects associated with inhomogeneity and the reduced frequency in quantifying compressibility effects. Note that Hemp's model for the influence of inhomogeneity and compressibility is expressed in terms of gas void fraction and reduced frequency, each of which are readily determined from a process-fluid sound speed measurement in conjunction with other information typically available from Coriolis meters and other common process measurements.

The effect of compressibility as a function of frequency is captured in the model with the reduced frequency. Hemp proposes that the compressibility constants for density and mass flow are Gd=0.25 and Gm=0.5, respectively. The values suggested by Hemp's reduced order model can be applied directly, or these values could be determined through an optimization process. In the first example developed below, we assume the values for Gd and Gm suggested by Hemp.

As described by Hemp, the decoupling constant for bubbly flows can be a function of many parameters including bubble size, bubble size distribution, gas/liquid density ratio, vibration frequency, and other parameters, many of which are unknown in many applications. The literature indicates that decoupling effects will depend on the inverse Stokes number as seen in the following equation:

$$k_d = F(\delta) \text{ where } \delta \equiv \sqrt{\frac{2v_f}{\omega a_{bubble}^2}}$$

Where F indicates an undefined function, $v_f$ is the kinematic viscosity, $\omega[v]$ is the vibration frequency of the mode of interest of the vibrating flow tube, and $a_{bubble}$ is the radius of the bubbles.

Based on theory and data presented in literature, it is reasonable to assume that the decoupling constant, Kd, used in the interpretation of vibrating tube density measurements at two different frequencies, but on the same fluid, may differ. Additionally, it is reasonable to assume that the decoupling parameters would vary with varying fluid conditions.

Hemp's formulations rely on decoupling constants, (Kd, Km), and/or compressibility constants (Gd, Gm), which in general are unknown, and depend or details of the applications as fluid viscosity, surface tension, bubble size, tube vibrational frequency, etc. Not only is this information not typically available in most applications, this information likely changes significantly with process fluid variability.

An example embodiment of the disclosure provides a methodology to enable practical determination of relevant parameters in relevant correction models to mitigate the effects of multiphase conditions on Coriolis meters. Said parameters may be determined during the operation of the Coriolis meter. With the parameters of relevant models identified and updated as needed, said models can be applied to enable Coriolis meters to practically and accurately measure the mass flow and/or density as well as other parameters of the process fluid.

The methodology described below provides a method to leverage mass flow and/or density measurements made simultaneously within the same flow tube or at different times but under the same flow conditions, at two or more frequencies in conjunction with a process fluid sound speed to provide the basis for near real-time determination of said coupling parameters, and thereby, provides a practical method to accurately characterize multiphase flows within multi-frequency Coriolis meters.

Equating the expressions for the density of the liquid phase of a process-fluid as measured by the interpretation of the natural frequency of two modes of vibration of the process-fluid conduits, yields the following equation:

$$\rho_{liq} = \frac{\rho_{m_1}}{1 - k_{d_1} \varphi_g + G_d(f_{red_1})^2} = \frac{\rho_{m_2}}{1 - k_{d_2} \varphi_g + G_d(f_{red_2})^2}$$

Rearranging the expression for the last equality yields the following:

$$\text{error}_{den_i} \equiv \left( \frac{\rho_{m_{1_i}}}{\left(1 - k_{d_1} \varphi_{g_i} + G_d f_{red_{1_i}}^2\right)} - \frac{\rho_{m_{2_i}}}{\left(1 - k_{d_2} \varphi_{g_i} + G_d f_{red_{2_i}}^2\right)} \right)^2$$

The above equation may be applied at each instance in time for which the apparent density for each frequency is measured, along with the speed of sound, gas void fractions and resonant tube frequencies. Errors determined from measurements at multiple instances "i" can be expressed as a summation.

Similarly, following Hemp for the mass flow measurement:

$$\dot{m}_{liq} = \frac{\dot{m}_{m_1}}{1 - (k_{M_1} - 1)\varphi_g/(1 - \varphi_g) + G_m(f_{red_1})^2}$$

$$= \frac{\dot{m}_{m_2}}{1 - (k_{M_2} - 1)\varphi_g/(1 - \varphi_g) + G_m(f_{red_2})^2}$$

Rearranging:

$$\text{Error}_{\dot{m}_i} \equiv \left( \frac{\dot{m}_{m_{1_i}}}{1 - (k_{M_1} - 1)\varphi_{g_i}/(1 - \varphi_{g_i}) + G_m(f_{red_{1_i}})^2} - \frac{\dot{m}_{m_{2)i}}}{1 - (k_{M_2} - 1)\varphi_{g_i}/(1 - \varphi_{g_i}) + G_m(f_{red_{2_i}})^2} \right)^2$$

A composite error function can be defined as:

$$\text{Error}_{composite} = \sum_{i+1}^{M} \left( \alpha_{\dot{m}} \text{Error}_{\dot{m}_i} + \alpha_\rho \text{Error}_{\rho_i} \right)$$

The example cases developed below utilize the density error function to optimize the density decoupling parameter and the mass flow error function to optimize the mass flow decoupling parameters, respectively. A composite error function, which includes contributions from both a mass flow error and a density error, could be used for cases in which a relationship between the mass flow and density decoupling parameters could be established, for example, if it were assumed that the mass flow and density decoupling parameters were equal, i.e. if kd1=km1, and/or kd2=km2.

It should be noted that the interpretation of a measured process-fluid sound speed in terms of gas void fraction using Wood's equation, or an approximation thereof, or similar, and requires some knowledge of the process-fluid density. Wood's equation for the process fluid speed of sound of a bubbly liquid can be expressed as:

$$\frac{1}{\rho_{mix}a_{mix}^2} = \frac{\varphi_g}{\rho_{gas}a_{gas}^2} + \frac{1-\varphi_g}{\rho_{liq}a_{liq}^2}$$

The mixture density can be expressed as:

$$\rho_{mix} = (1-\varphi_g)\rho_{liq} + \varphi_g\rho_{gas}$$

And using an ideal gas law and the expression for the speed of sound of a polytropic gas: $p=\rho RT$ and $a_{gas}=\sqrt{KRT}$ And assuming the gas density is much less than the liquid density, and the compressibility of the gas component is far larger than the liquid component results in the following simplification of Wood's equation:

$$\frac{1}{\rho_{mix}a_{mix}^2} \cong \frac{\varphi_g}{\rho_{gas}a_{gas}^2}$$

$$\rho_{mix} \cong (1-\varphi_g)\rho_{liq}$$

Which has the solution for gas volume fraction as follows.

$$\varphi_g = \frac{1-\sqrt{1-\frac{4PK}{\rho_{liq}a_{mix}^2}}}{2}$$

In the examples developed herein, we minimize the density error function to determine the density of the liquid phase of a bubbly mixtures measured utilizing a two-frequency Coriolis meter at multiple instances. The example simulates "net oil" well test, which the liquid fluid density is varying due to varying watercut of the produced liquids and the gas void fraction is also varying. The liquid density at each instance is sought to determine measured watercut.

The minimization of the error function utilizes measured process fluid speed of sound, process fluid pressure, the measured densities at the two frequencies from the Coriolis meter, the measured tube vibration frequency, the ratio of specific heats (K) for the gas, and "trial" values for the decoupling and compressibility parameters to determine gas void fraction as part of the optimizations process.

The simulation utilizes Hemp's model for density errors to simulate the measured densities from a two-frequency Coriolis meter operating on a mixture 55% to 85% watercut with measured mixture sound speeds of 100 to 700 m/sec, operating at a process pressure of 200 psia, with entrained gas with a ration of specific heats of 1.3, where the density of the water is 1000 kg/m^3 and the density of the oil phase is 930 kg/m^3. The Coriolis meter had 2 inch diameter flow tubes which one frequency of vibration at 78 Hz, and one frequency at 420 Hz, with decoupling constants of Kd1=1.2 and Kd2=2.5 and a compressibility parameter of Gd=0.25. Note that the simulation assumes that decoupling parameters and the compressibility parameters remain constant for each of the instances.

The data for the simulation was simulated at 10 instances in which the watercut and the speed of sound of the process fluid were selected randomly between the listed extremes. The measured values for the density measured at the two frequencies, the error factor in the measured densities due to decoupling and compressibility, the reduced frequencies and the process-fluid sound speed are plotted versus gas void fraction in the graph depicted in FIG. 10.

The graph in FIG. 11 shows the results of the optimization based on equating measured densities at two frequencies showing the densities measured at two frequencies, the corrected liquid density at each frequency, and the actual liquid density versus gas void fraction. Trial values for the decoupling parameters, Kd1 and Kd2, were bounded between 1 and 3, and the compressibility parameter was fixed at Gd=0.25 for the optimization process. As shown, the corrected liquid densities match both each other and the actual fluid density.

The graph in FIG. 12 shows the same results as the graph in FIG. 11, but with the densities normalized by the input liquid density versus gas void fraction.

The graph in FIG. 13 shows the results of a similar optimization with the same range of the randomly selected input parameters but with 2% random noise added to the speed of sound measurement after the simulated measured densities were calculated. This figure is presented to show a degree of robustness of the optimization process to noise.

The graph in FIG. 14 shows and example of the Error function based on equating densities measured at two frequencies as a function of trial decoupling parameters, showing the input values of the decoupling parameters and the Optimized values. As shown, the error function exhibits a trough for which the difference in the two decoupling parameters is nearly constant. Despite this trough, the minimum of the error function is located at the input values, provided there is process variability, i.e measurements from multiple process conditions are required for the optimization to define a unique solution for the density decoupling parameters. This process variability will likely take the form of variable gas void fraction or other process variables observed at multiple instances.

The mass flow measured at two frequencies can also be used to determine the mass flow decoupling constants Hemp's models. In the example, the simulation utilizes Hemp's model for mass flow errors to simulate the measured mass flows from a two-frequency Coriolis meter operating on a mixture 55% to 85% watercut with measured mixture sound speeds of 200 to 700 m/sec, operating at a process pressure of 200 psia, with entrained gas with a ration of specific heats of 1.3, where the density of the water is 1000 kg/m^3 and the density of the oil phase is 930 kg/m^3. The Coriolis meter had 2 inch diameter flow tubes which one frequency of vibration at 78 Hz, and one frequency at 420 Hz, with density decoupling constants of Kd1=1.2 and Kd2=2.5 and a density compressibility parameter of Gd=0.25. The mass flow decoupling parameters were Km1=2.0 and Km2=2.5 with the mass flow compressibility parameter of Gm=0.5. The mass flow rate was randomly varying between 1.5 and 1.8 kg/sec as described in the graph in FIG. 15.

Note that for the mass flow optimization, the liquid phase density remains a necessary input for interpreting the measured process fluid speed of sound, and other parameters of the mixture, in terms of gas void fraction. In this simulation, it is assumed that the density decoupling and compressibility parameters are known prior to the mass flow optimization, by for example, performing a density parameter optimization prior to the optimization to determine the mass flow decoupling parameters.

The graph in FIG. 15 shows data simulated at 10 instances in which the watercut and the speed of sound of the process fluid, and mass flow were selected randomly between the listed extremes. The plot shows measured values for the mass flow was simulated at the two frequencies, error factors for the measured mass flow due to decoupling and compressibility, the reduced frequencies and the process-fluid sound speed plotted versus gas void fraction.

The graph in FIG. 16 shows the results of optimization based on equating measured mass flows at two frequencies showing the mass flows measured at two frequencies, the corrected mass flow at each frequency, and the actual mass flow versus gas void fraction. These results include 2% uncorrelated noise on the speed of sound measurement, applied after the calculation of the offsets. As shown, the corrected liquid mass flows for each frequency match both each other and the actual fluid density The graph in FIG. 17 shows results of optimization based on equating measured mass flows at two frequencies showing the normalized massflow measured at two frequencies, the corrected nondimensional mass flow at each frequency, and the actual nondimensional mass flow versus gas void fraction.

The graph in FIG. 18 shows an example of an Error function based on equating mass flows measured at two frequencies showing the input values of the decoupling parameters and the optimized values for the decoupling parameters. As shown, the mass flow based error function has a similar trough, indicating a preference for solutions in which the delta between the mass flow decoupling constants for the two frequencies are equal. Again, similar to the density based error function shown in the graph titled "Example of an Error function based on equating densities measured at two frequency showing the input values of the decoupling parameters and the Optimized values" the minimal error occurs at the correct mass flow decoupling parameters provided that there is some degree of process variability in the input data.

As developed above, the addition of a speed of sound measurement in a process-fluid improves the accuracy of a multiple frequency Coriolis meter operating on either homogeneous flows or nonhomogeneous flows for which compressibility effects can be significant and where decoupling effects are negligible. Decoupling effects approach zero for gas entrained flows for large inverse Stokes numbers, in highly viscous flows or in flows with small bubble sizes. In Hemp's formulation, setting Kd1=Kd2=1 and Km1=Km2=1 eliminates any decoupling between gas and liquid phases.

The compressibility constant in Hemp's formulation can be determined for each vibrational frequency through an optimization process, similar to that developed above for the decoupling constants.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed invention and associated methods, reference is made to the accompanying figures, wherein: Example figure descriptions follow.

DESCRIPTION

Figure 1:
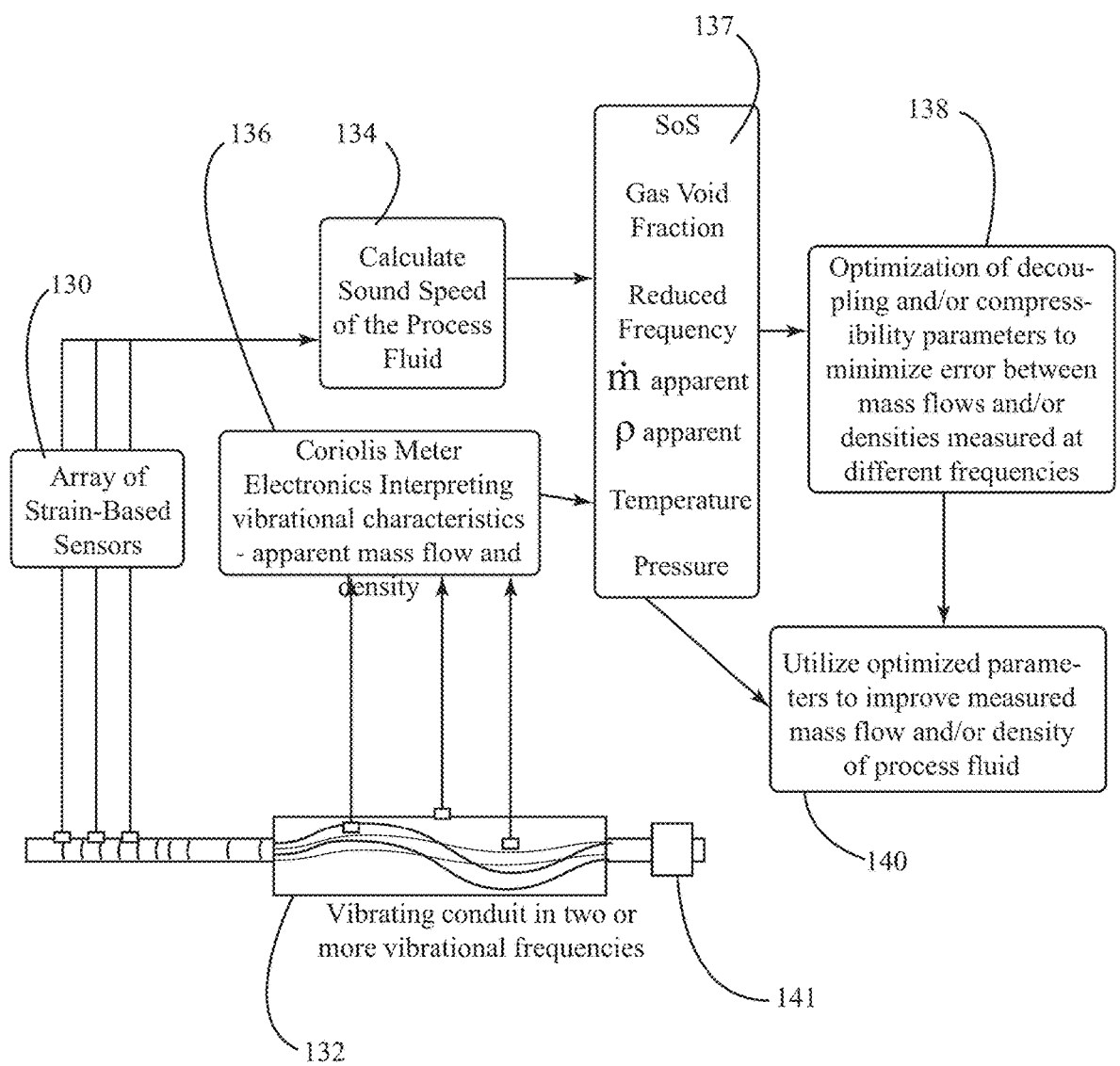
FIG. 1 is a schematic of an example Coriolis meter employing the measurement of the speed of sound through a process-fluid.

Referring to FIG. 1, an example embodiment is depicted in the illustration. An array of strain based sensors 130 are in fluid communication with flow tubes of a Coriolis meter. The strain based sensors are used to calculate the speed of sound propagated through the process fluid 134. The flow tubes in the Coriolis meter 132 vibrate at two or more frequencies. The Coriolis meter electronics interpret vibrational characteristics in terms of apparent mass flow and apparent density 136. The calculated speed of sound and measured process-fluid pressure are used to determine a reduced frequency for each vibrational frequency and a gas void fraction of the process fluid 137. The $\alpha_{apparent}$ and $\dot{m}_{apparent}$ are combined with the speed of sound and reduced frequencies and are then sent to an algorithm that optimizes decoupling and/or compressibility parameters to minimize error between mass flows and/or densities measured at different frequencies 138. The optimized parameters are used to improve measured mass flow and/or density of the process fluid 140.

Figure 2:
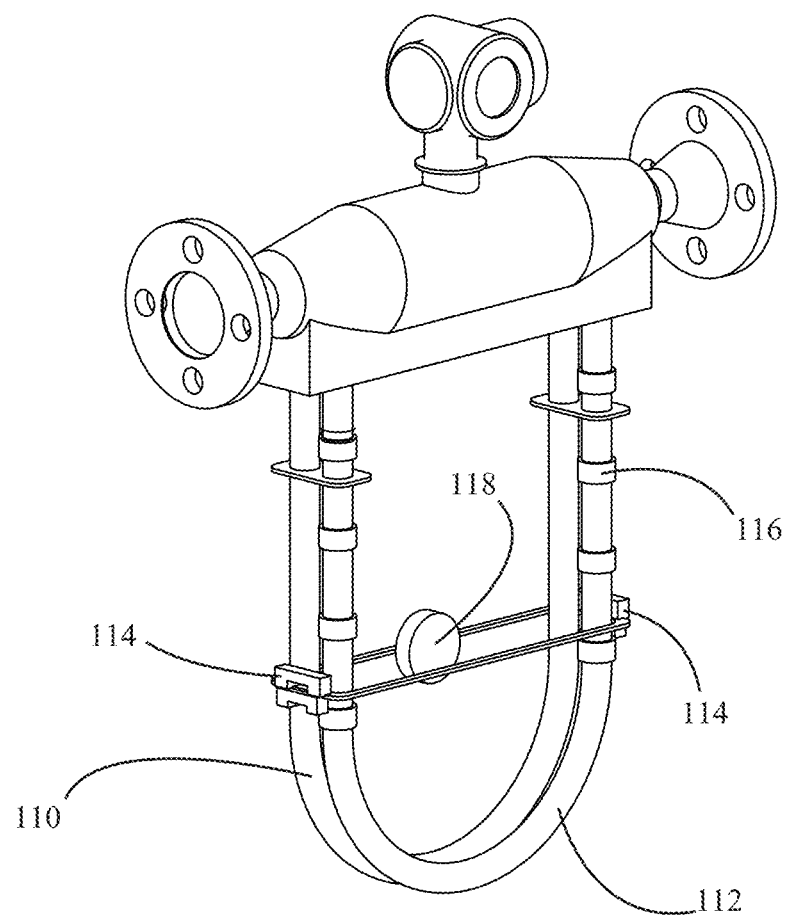
FIG. 2 is an example embodiment showing a Coriolis meter having a plurality of strain based sensors and an exciter.

Referring to FIG. 2, an example Coriolis meter 100 is shown with a number of strain based sensors 116 arrayed along one of a pair of flow tubes 110/112. Two pick-off coils (114) are shown to measure the natural frequency of the vibrations and twist of the vibrating flow tube. In other words, the pick-off coils responsive to the vibration and twist of a vibrating flow tube. An exciter 118 is supported by the framework surrounding the Coriolis meter.

Figure 3A:
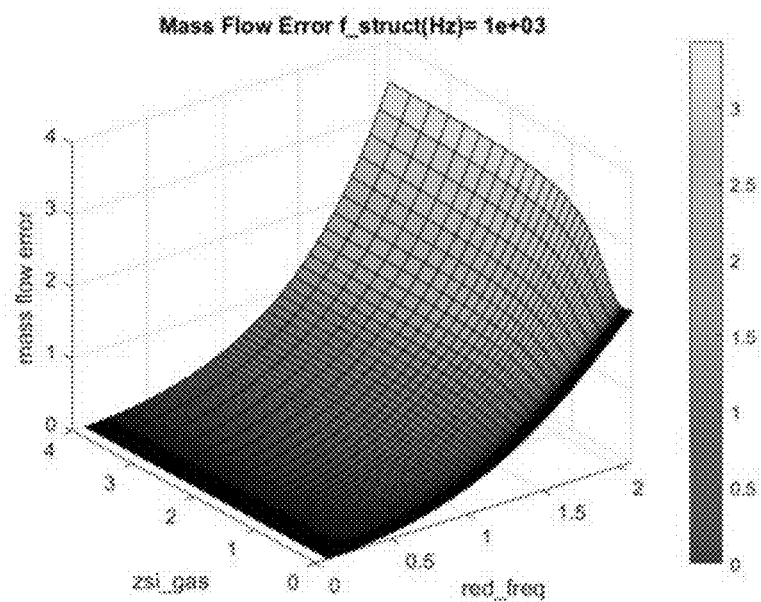
FIG. 3A is a graph depicting mass flow and density error reading as a function of gas damping ratio and reduced frequency.
Figure 3B:
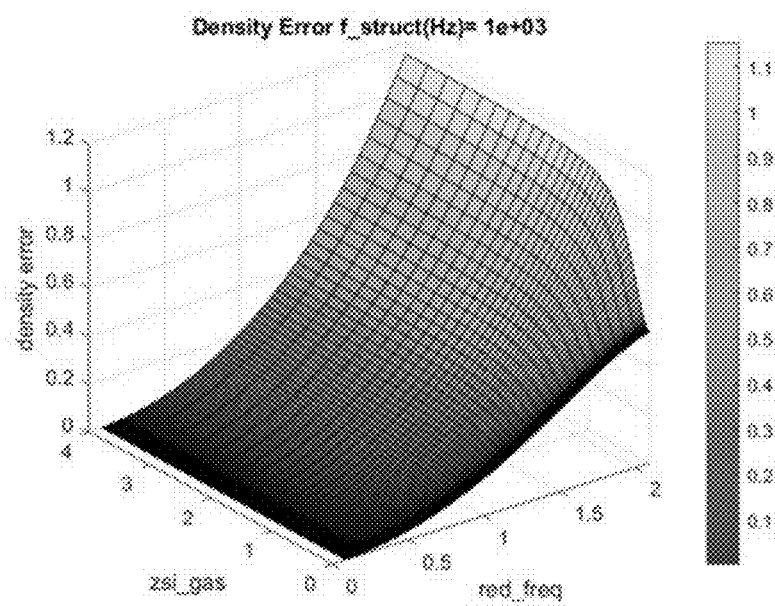
FIG. 3B is a graph depicting mass flow and density error reading as a function of gas damping ratio and reduced frequency.

Referring to FIGS. 3A, 3B errors interpreting the mass flow and density errors for a Coriolis operating on a multiphase flow with an interpretation method applicable to homogeneous fluids operating at low reduced frequencies is depicted in the paired graphs. The errors were predicted using a simplified aeroelastic model of a Coriolis meter (ref Gysling) over a range of gas bubble damping parameters (decoupling parameter) and reduced frequency parameter (compressibility parameter). These predictions for the errors due to decoupling and compressibility were made based on a model that utilizes the speed of sound to calculate gas void fractions and reduced frequencies. Since gas void fraction and reduced frequency are strongly linked through the process fluid speed of sound, this formulation utilizes reduced frequency as the variable that captures both decoupling and compressibility effects within the model predictions.

One skilled in the art understands that any empirical or computational model that characterizes the relationship between the measured vibrational characteristics of the fluid-conveying flow tube, i.e. tube phase shift and tube natural frequency, and the multiphase flow properties within the meters could be used in similar manner.

In this example the reduced order model of Gysling was used to calculate the apparent mass flow and density "measured" by a dual frequency Coriolis meter operating on a bubbly mixture. The first in-vacuum bending frequency of the tube was set to 300 Hz, and the second was set at 1100 Hz. The tube diameter was 2 inches. The simulated operating conditions for the process fluid for this test case was bubbly mixture of air and water at ambient pressure with 2% gas void fraction. The actual mass flow through the meter was set at 4.0 kg/sec and the liquid density was set at 1000 kg/m^3. The reduced frequency of tube 1 is 0.57 and tube 2 is 2.09. The gas damping ratio, termed the decoupling parameter in the model, was set to 0.5 for both frequencies. The apparent mass flow and mixture density for tube 1 was 4.44 kg/sec and 1038 kg/m^3, and for tube 2, 14.18 kg/sec and 1927 kg/m^3.

Referring to the aforementioned equation:

$$\text{error} = \alpha_m ((\dot{m}_{f1_{trial}} - \dot{m}_{f2_{trial}})/(\dot{m}_{f1_{trial}} + \dot{m}_{f2_{trial}}))^2 + \alpha_\rho ((\rho_{f1_{trial}} - \rho_{f2_{trial}})/(\rho_{f1_{trial}} + \rho_{f2_{trial}}))^2$$

The trial mass flows and densities are formed by correcting the measured, or apparent, mass flows and densities to actual mass flows and density using the over reading function shown as a surface in FIGS. 3A, 3B. for a given set of trial decoupling and compressibility parameters. An error is formed based on the trial mass flows and trial densities associated with the measured, or apparent, mass flows and densities at the two frequencies. The error is minimized when the corrected mass flows and corrected densities predicted at the two frequencies match, respectively for a given set of trial decoupling and compressibility parameters. To determine the parameters of the multiphase flow flowing through the meter, the error function is then minimized over a suitably wide range of decoupling ($zsi_{gas}$) and compressibility parameter ($f_{red}$) Once the parameters of the model are adjusted such that the error function is minimized, the optimized mass flow and mixture density are determined.

Figure 4A:
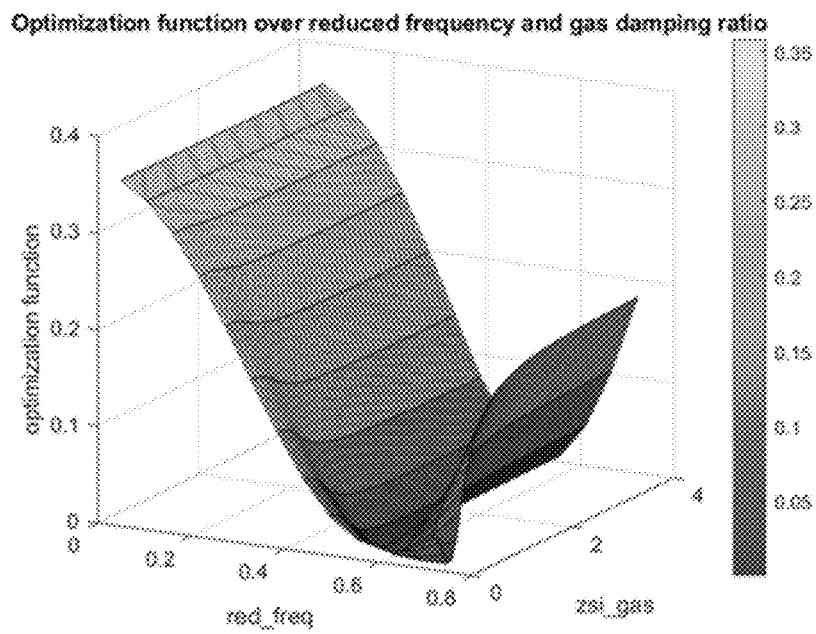
FIG. 4A is a graph depicting dual frequency Coriolis optimization simulated with reduced order model.
Figure 4B:
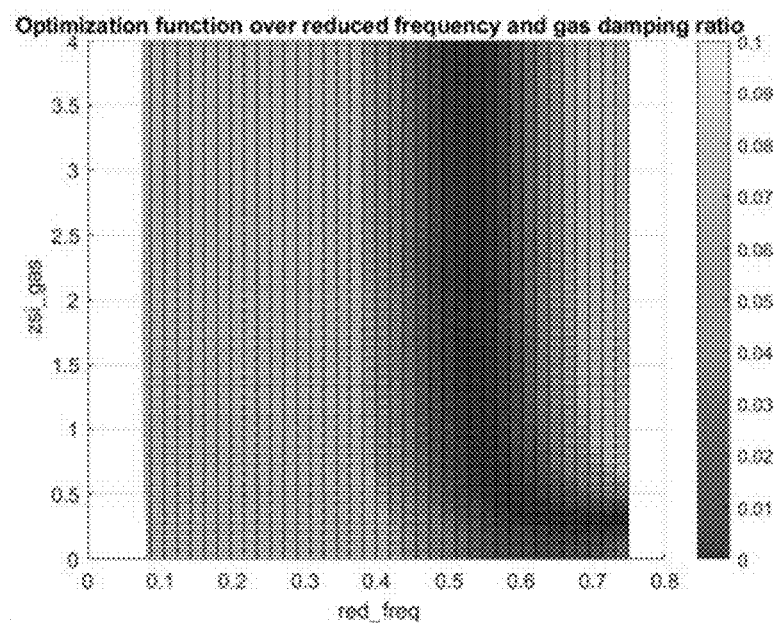
FIG. 4B is a graph depicting dual frequency Coriolis optimization simulated with reduced order model.

Referring to FIGS. 4A, 4B the error function, for the example described in FIGS. 3A 3B versus the decoupling parameter and reduced frequency of the first tube frequency is described in the paired graphs. For this example, the weighting of the error contributions for the mass flow errors and the density errors are set to unity. The left figure shows the general surface shape, and the right shows the surface viewed from above with the color axis limited to highlight the existence of multiple solutions, for example, combinations of decoupling parameter, zsi_gas, and reduced frequency for which the error function approaches zero As shown, if the error function is evaluated over a range of reduced frequencies and coupling parameters, the optimization would be confounded, and unable to determine either the best reduced frequency or the best decoupling parameter, and therefore unable to report a unique mass flow or density.

FIGS. 4A, 4B also shows the same optimization function using the measured process fluid sound speed and therefore having a known reduced frequency for each vibrational mode evaluated over a range of the decoupling parameters. As shown, this additionally-constrained optimization yields a unique solution for the multiphase parameters in this albeit simplified, yet representative, example, thereby enabling the meter to report a more accurate and robust measurement of the mass flow and density of the two phase mixture based on an optimization process equating the mass flow rates measured at two frequencies and/or the densities measured at two frequencies.

Figure 5:
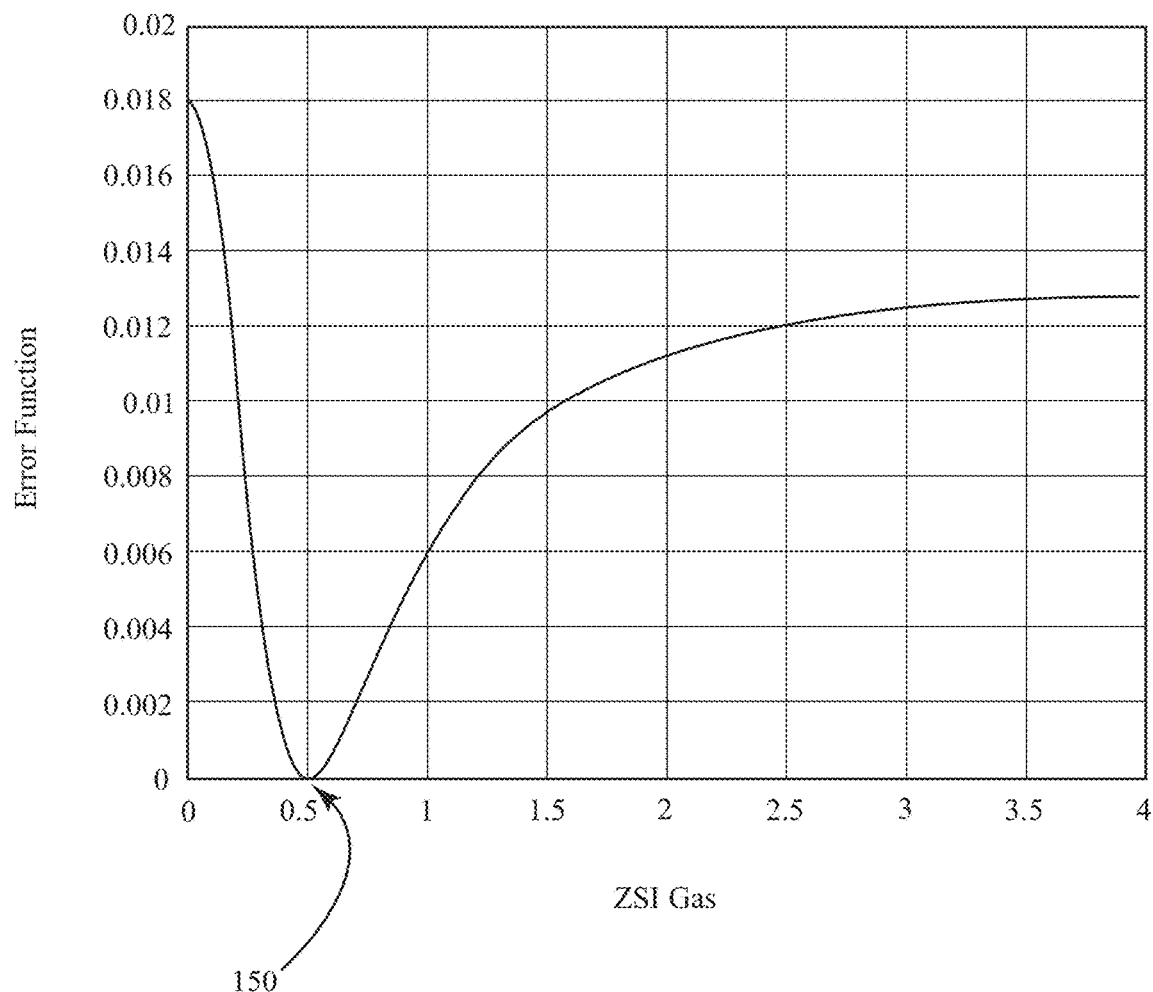
FIG. 5 is a graph depicting optimization function over decoupling parameter using measured reduced frequency.

Referring to FIG. 5 this self-consistency example, the decoupling parameter of 0.5 is identified by the optimization. Using this identified decoupling parameter, and the apparent mass flow and density at either tube frequency, enables meter to report accurate mass flow and mixture density. One skilled in the art understands that Coriolis based density measurements in multiphase flows may be more robust and repeatable than the Coriolis-based mass flow measurement under the same conditions. In these cases, it may be beneficial to increase the weighting of the density measurement error contribution in the error function compared to the weighting of the mass flow error contribution.

Figure 6:
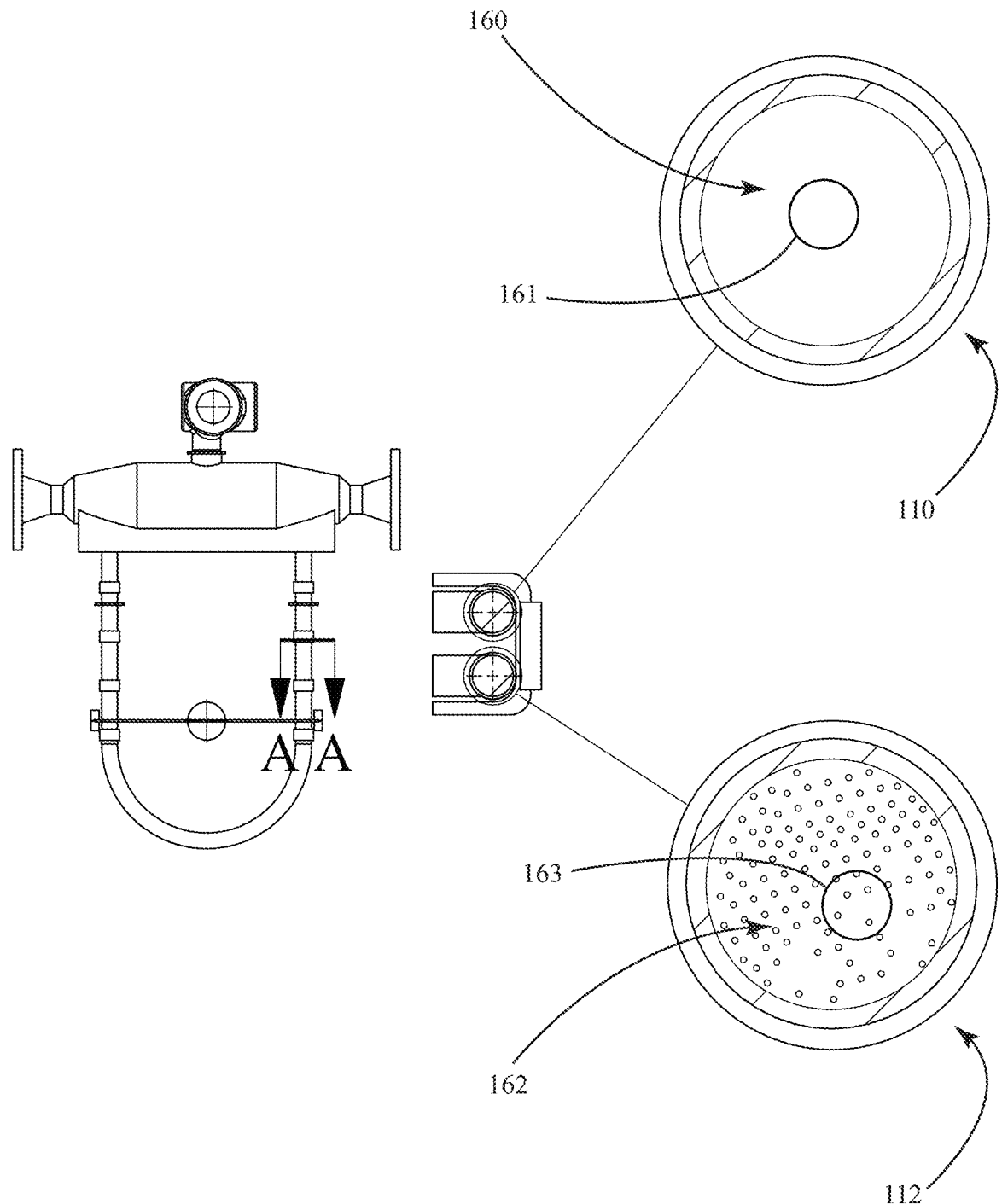
FIG. 6 is a detailed cross section depicting decoupling parameters.

Referring to FIG. 6 a horizontal cross section of two flow-tubes 110/112 is depicted in the illustration. The illustration demonstrates decoupling inhomogeneous flow. Flow tube 110 has a homogeneous flow 160 without entrained gas. The center of mass 161 is in the center of the flow-tube 110. The flow-tube 112 has an inhomogeneous flow 162 with entrained gas that is not homogeneous. The center of mass 163 is not in the center of the flow-tube.

Figure 7:
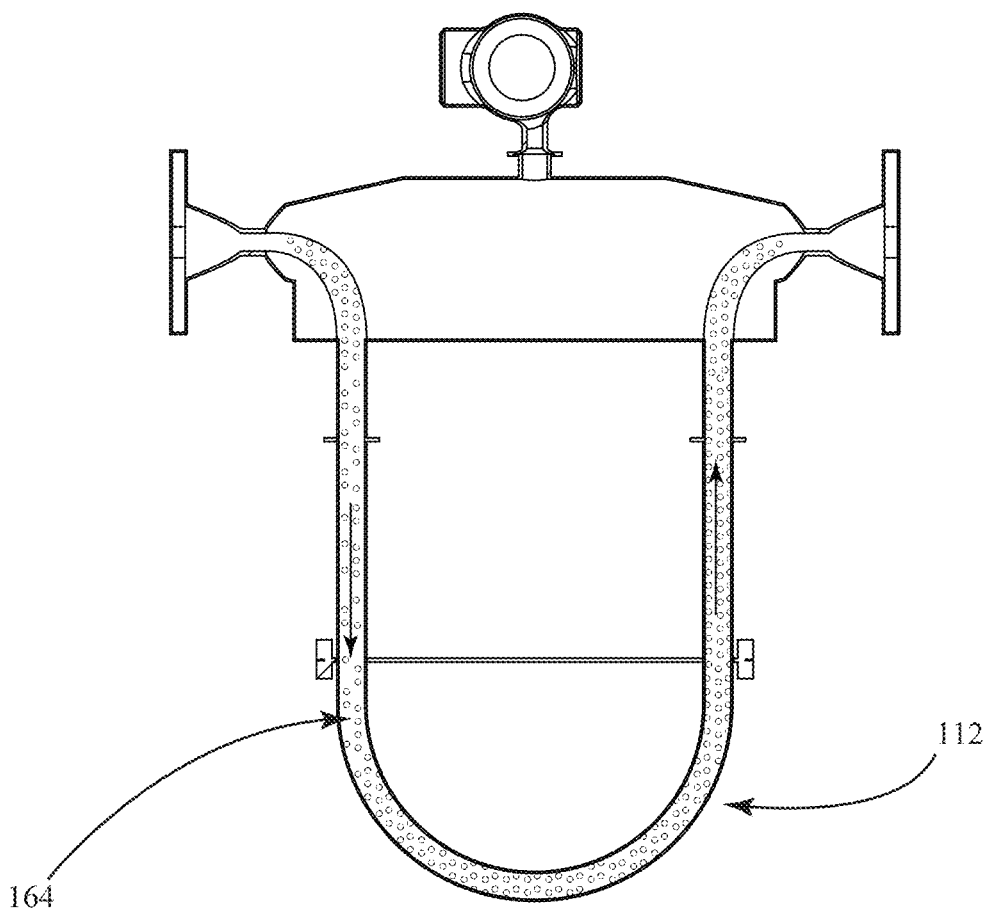
FIG. 7 is a cross section depicting decoupling parameters

Referring to FIG. 7, a vertical cross section of a flow-tube is depicted in the illustration. An inhomogeneous gas-entrained flow 164 has a varying density of entrained gas about the flow path. Decoupling of an inhomogeneous fluid is said to occur within a fluid when one phase of a fluid vibrates differently than another phase. One skilled in the art understands that the effects of decoupling are determined substantially as a function of the measured gas void fraction.

Figure 8:
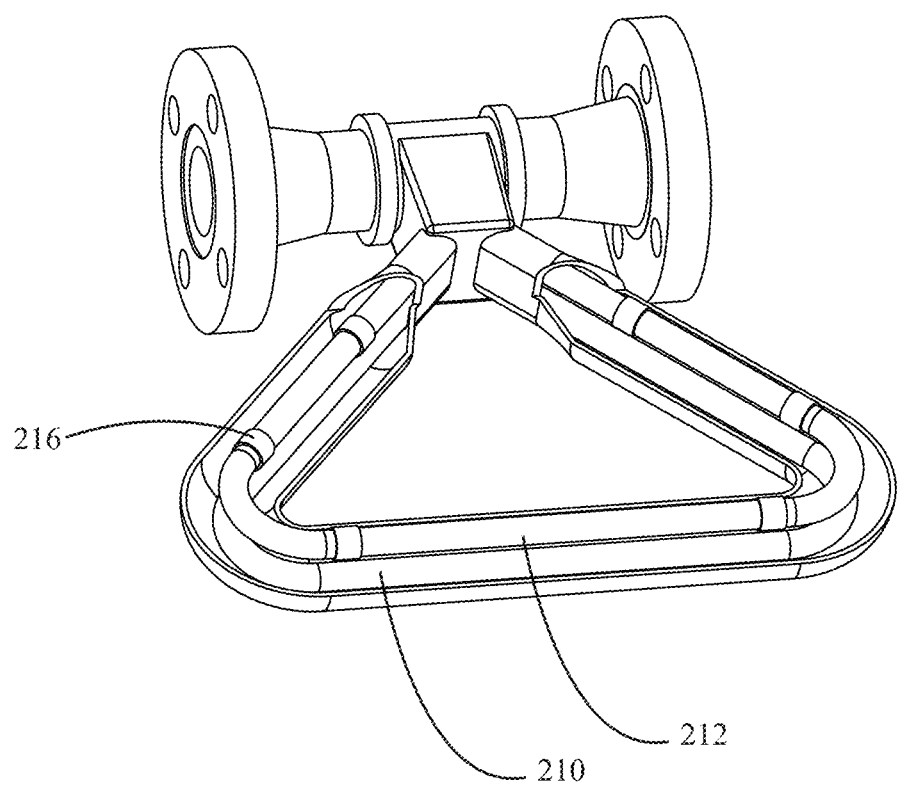
FIG. 8 is an example Coriolis meter adapted to the embodiment.

Referring to FIG. 8 an example Coriolis meter 200 is shown with a number of strain based sensors 216 arrayed along one of a pair of flow tubes 210/212. One skilled in the art understands that the example may include pick-off coils and an exciter as necessary to generate and measure the natural frequency of the vibrations and twist of the vibrating flow tube may also be installed on the example Coriolis meter.

Figure 9:
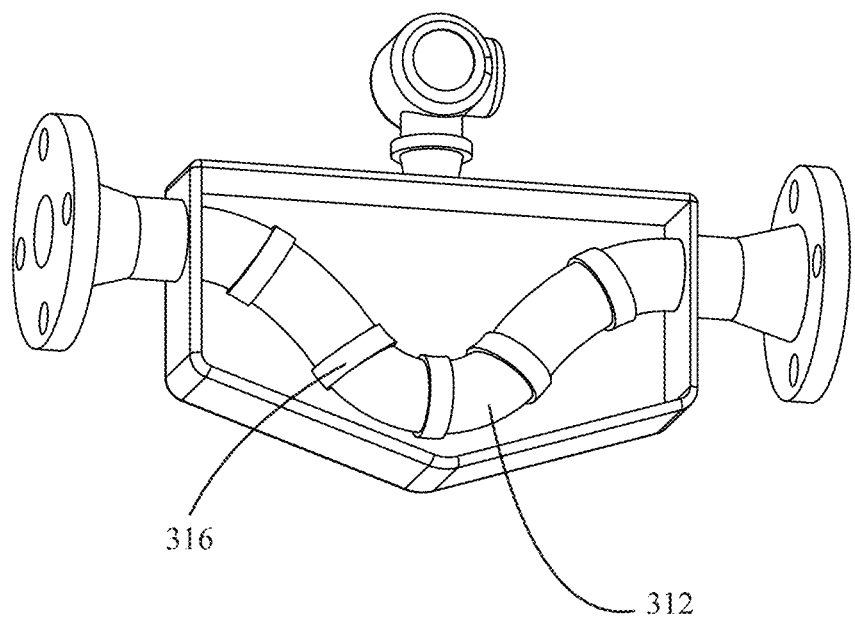
FIG. 9 is an example Coriolis meter adapted to the embodiment.
Figure 10:
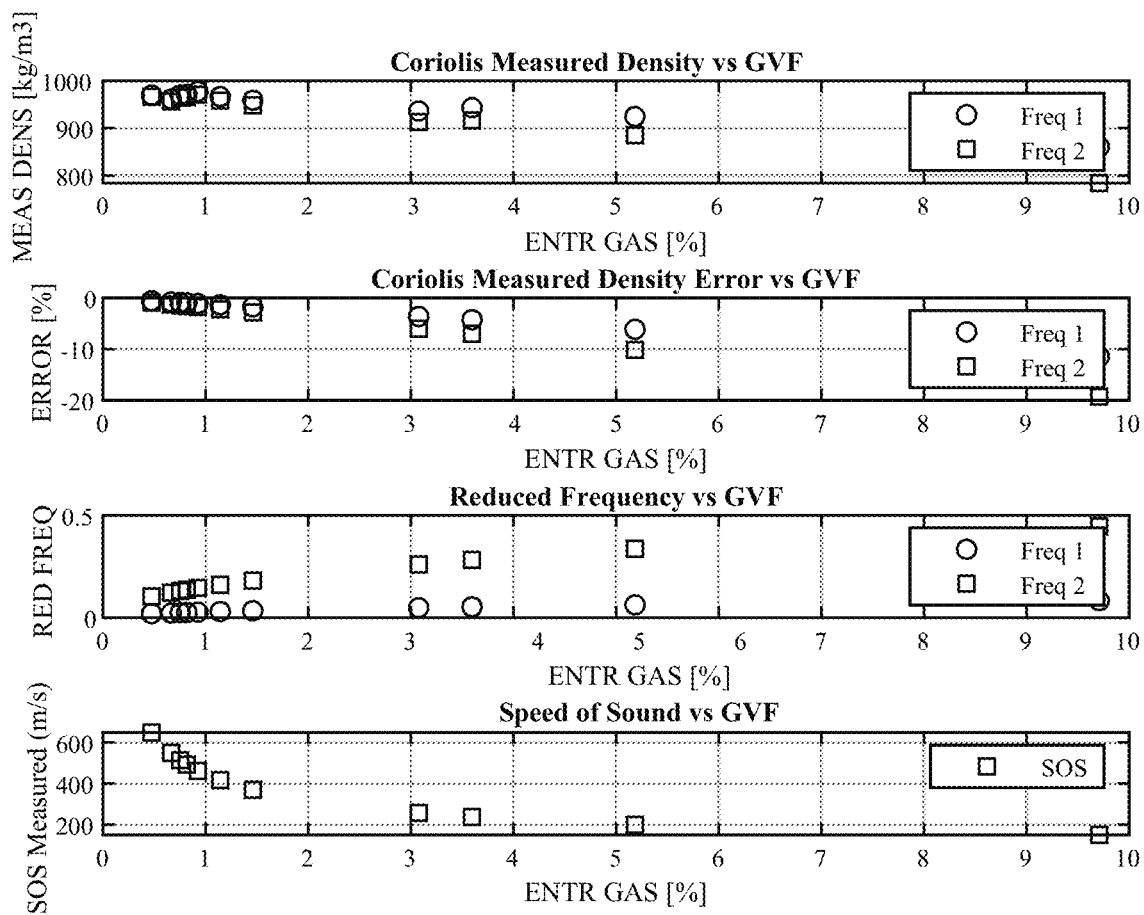
FIG. 10 is a graph depicting reduced frequencies and the process-fluid sound speed plotted versus gas void fraction.
Figure 11:
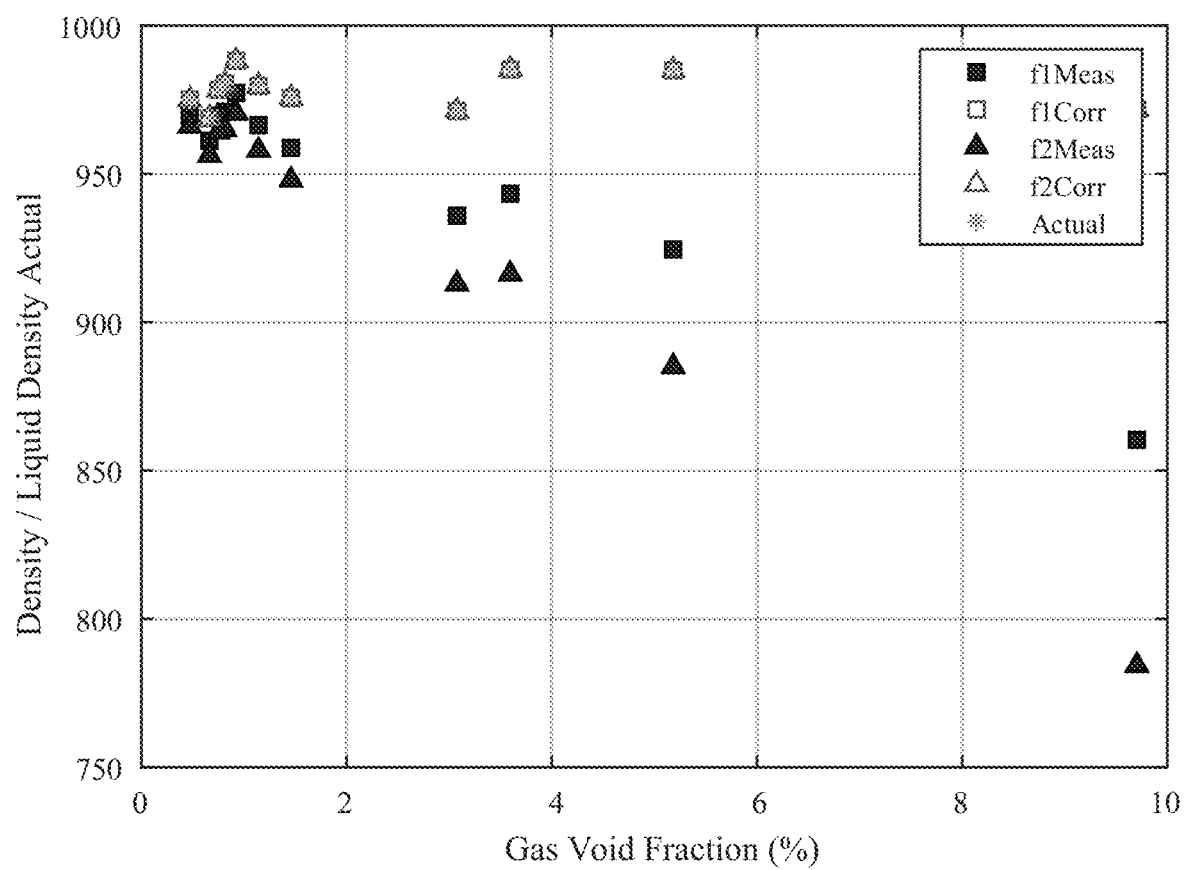
FIG. 11 is a graph that shows the results of the optimization based on equating measured densities at two frequencies.
Figure 12:
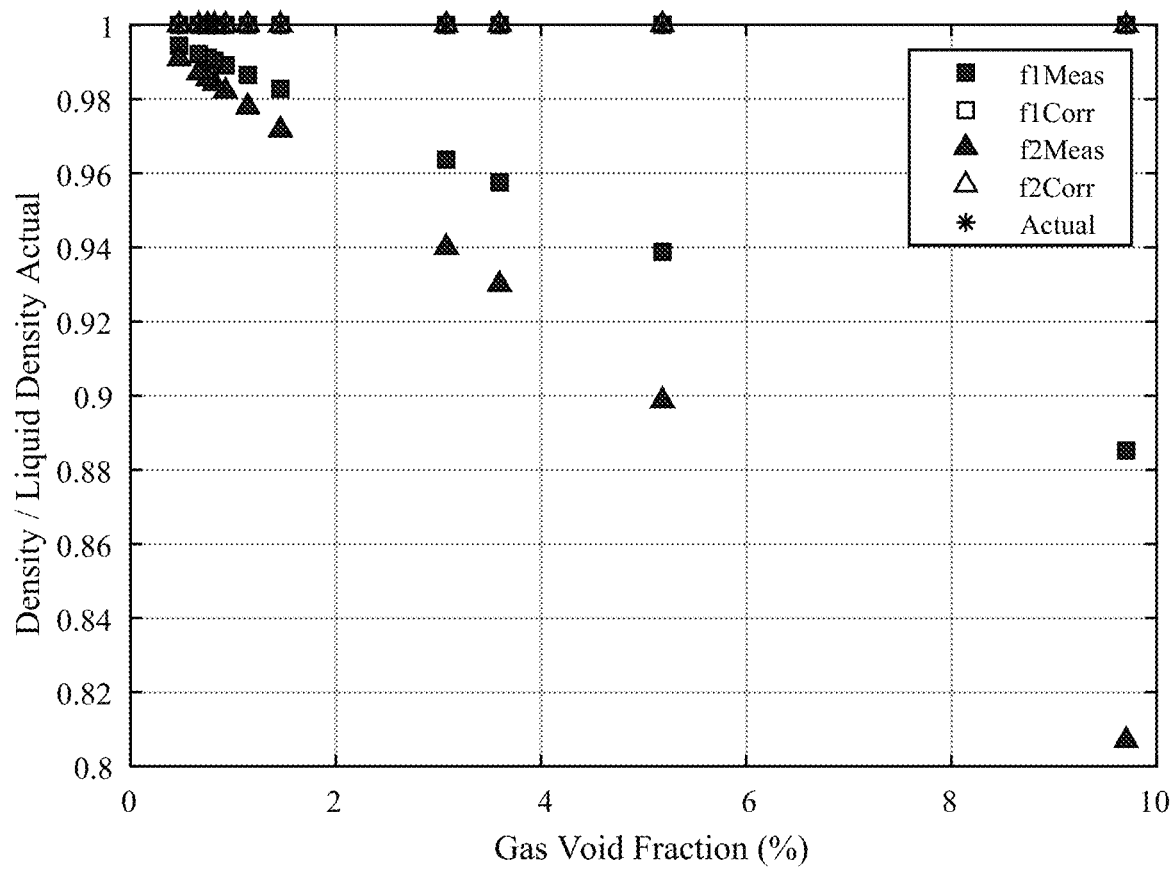
FIG. 12 is a graph that shows densities normalized by the input liquid density versus gas void fraction.
Figure 13:
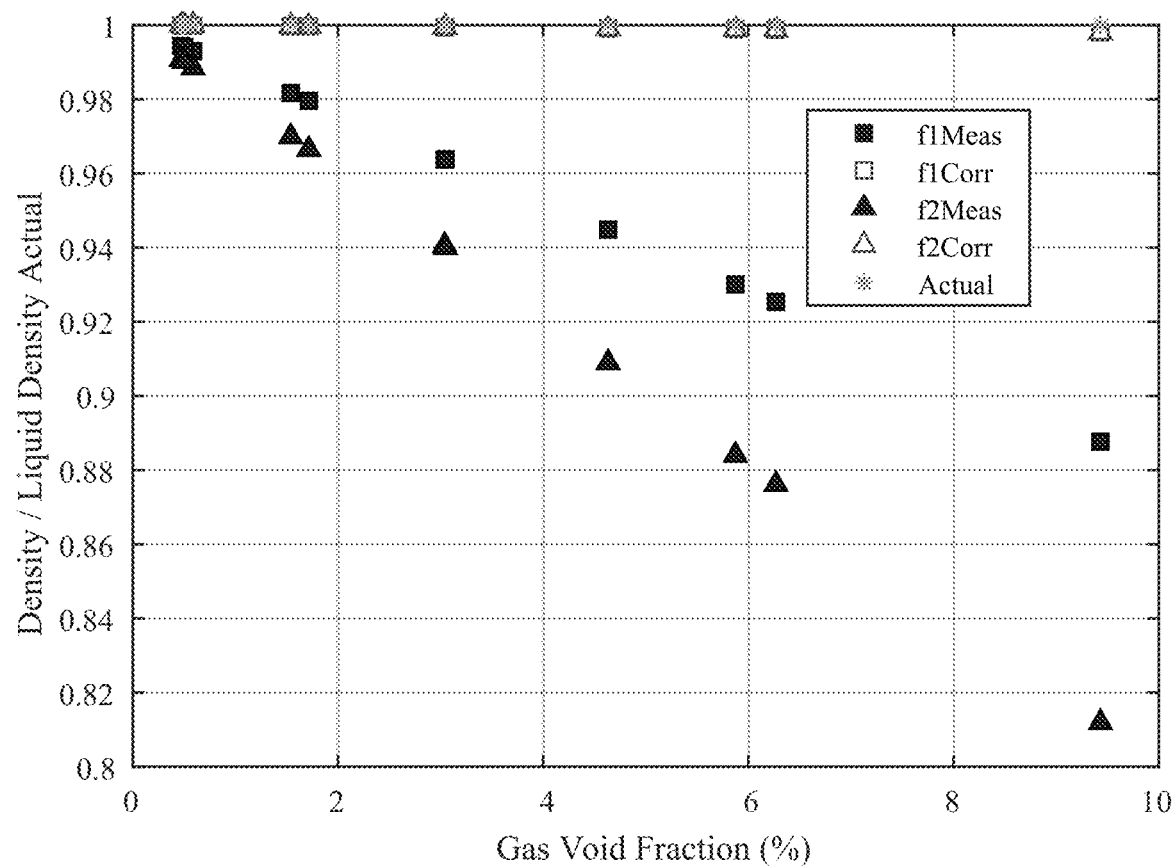
FIG. 13 is a graph that shows the results of a range of the randomly selected input parameters with 2% random noise added to the speed of sound measurement.
Figure 14:
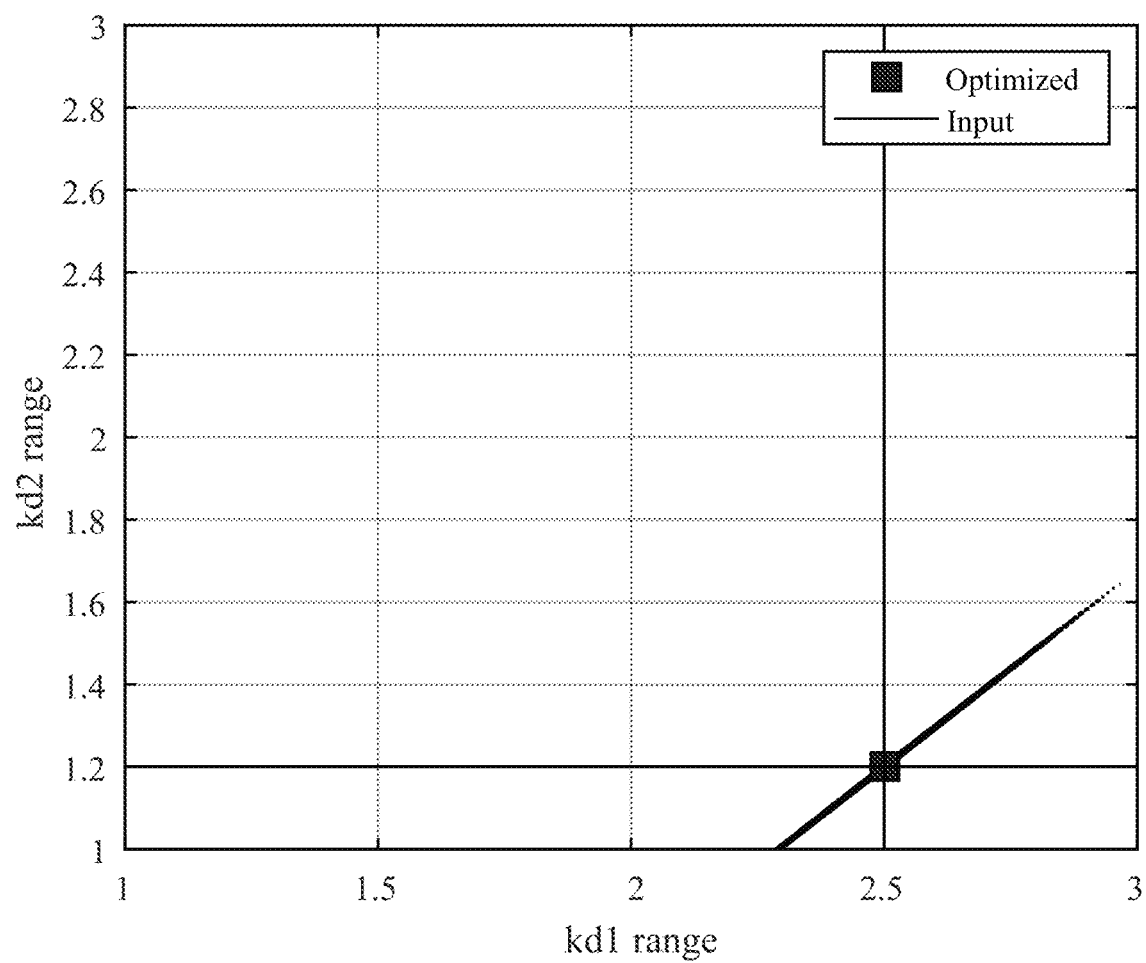
FIG. 14 is a graph that shows and example of the Error function based on equating densities measured at two frequencies as a function of trial decoupling parameters.
Figure 15:
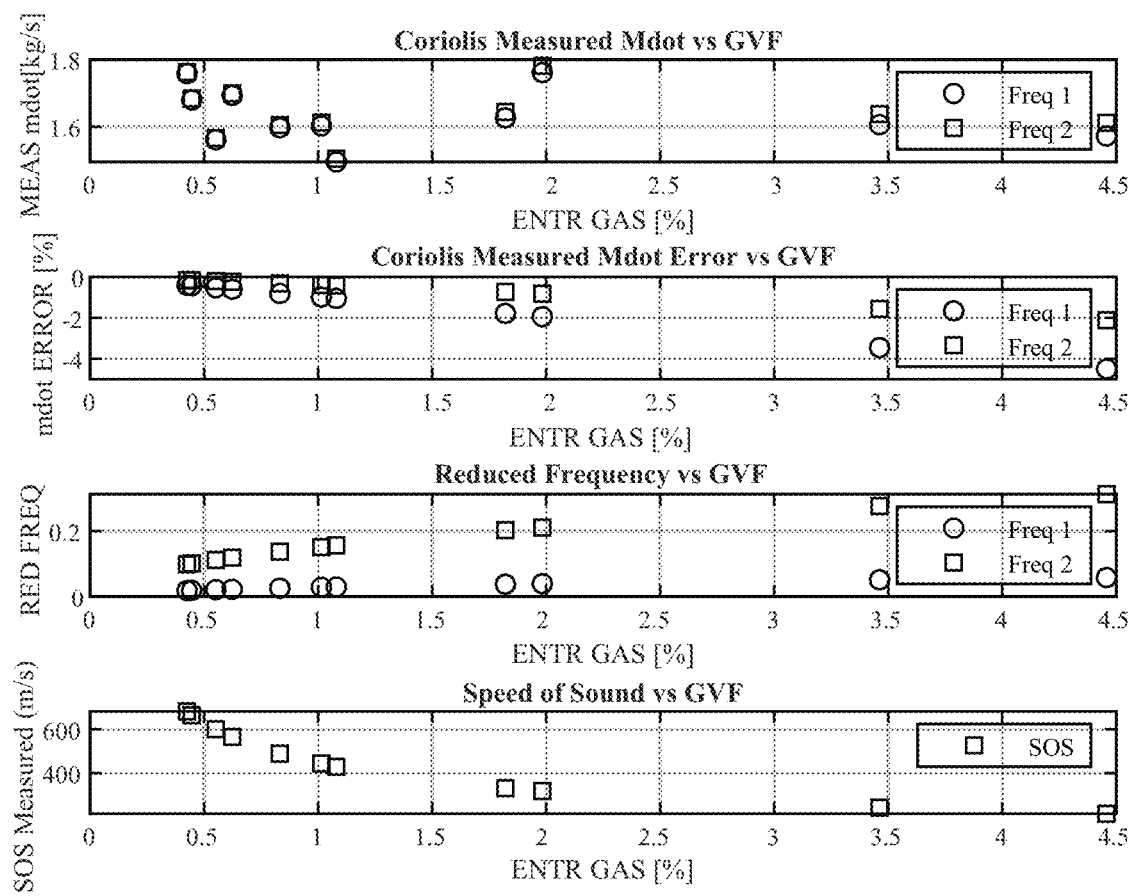
FIG. 15 is a graph that shows mass flow rate randomly varying between 1.5 and 1.8 kg/sec.
Figure 16:
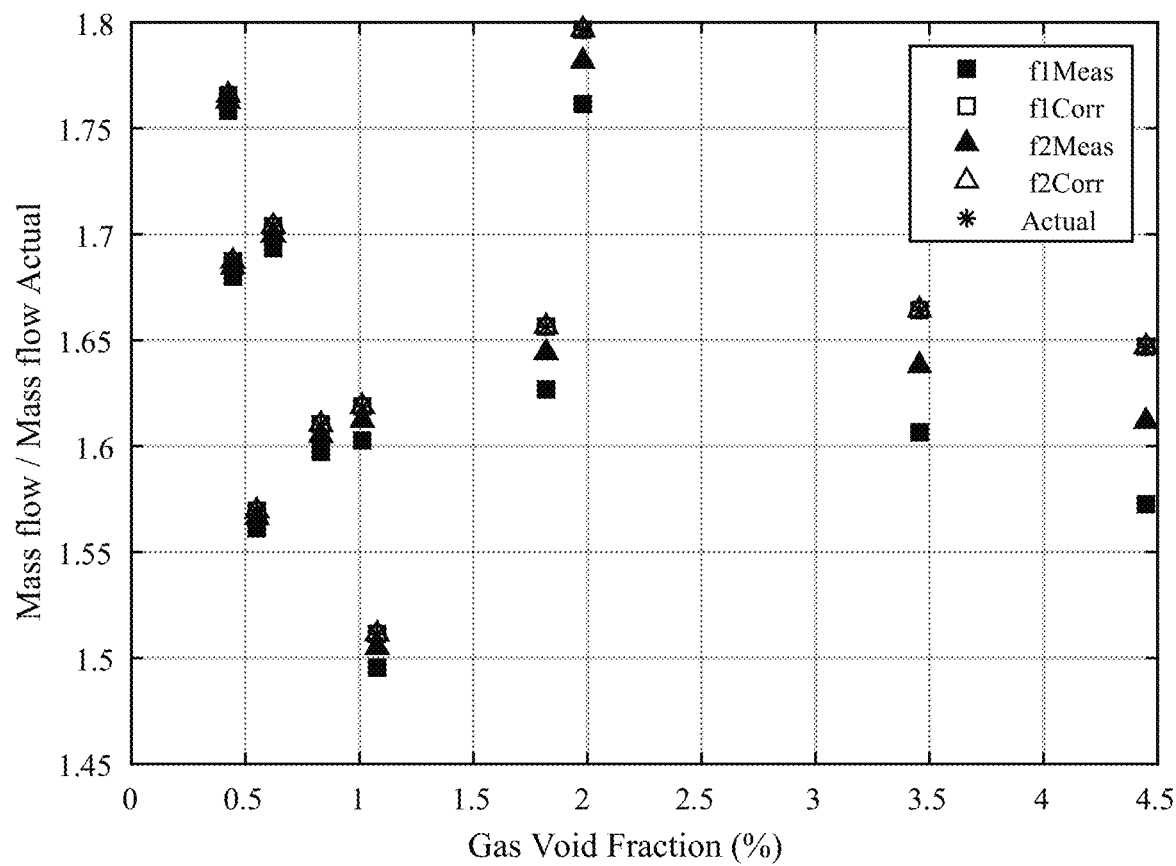
FIG. 16 is a graph that shows the results of optimization based on equating measured mass flows at two frequencies.
Figure 17:
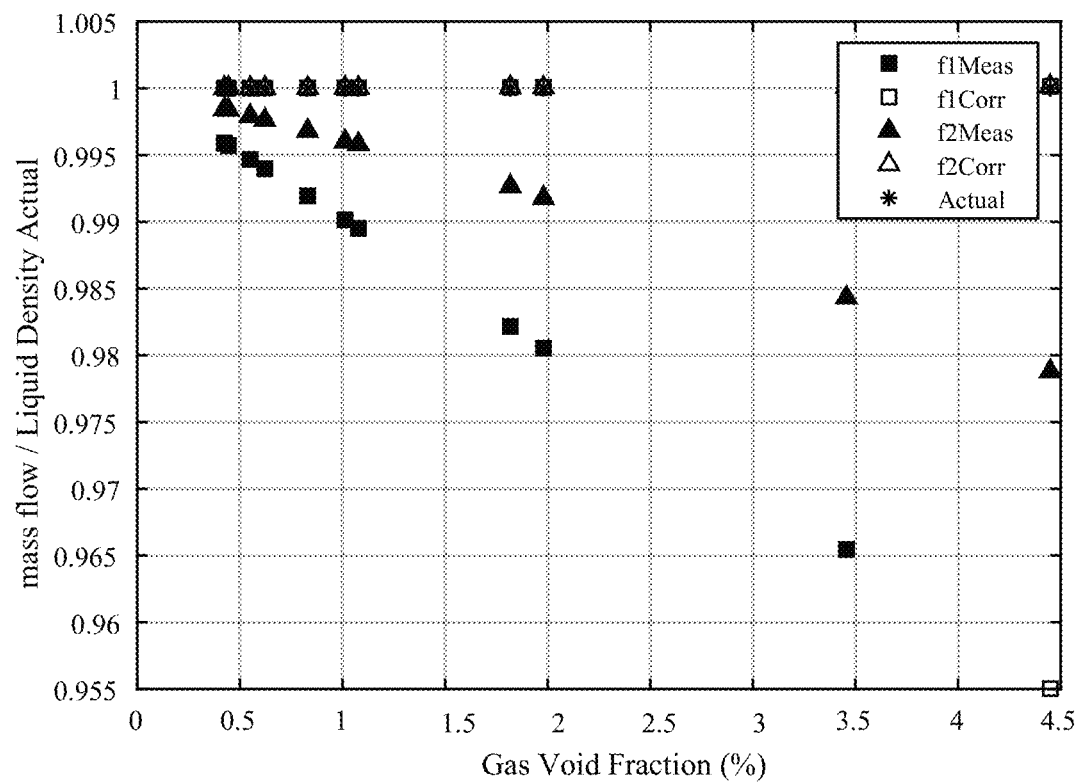
FIG. 17 is a graph that shows results of optimization based on equating measured mass flows at two frequencies.
Figure 18:
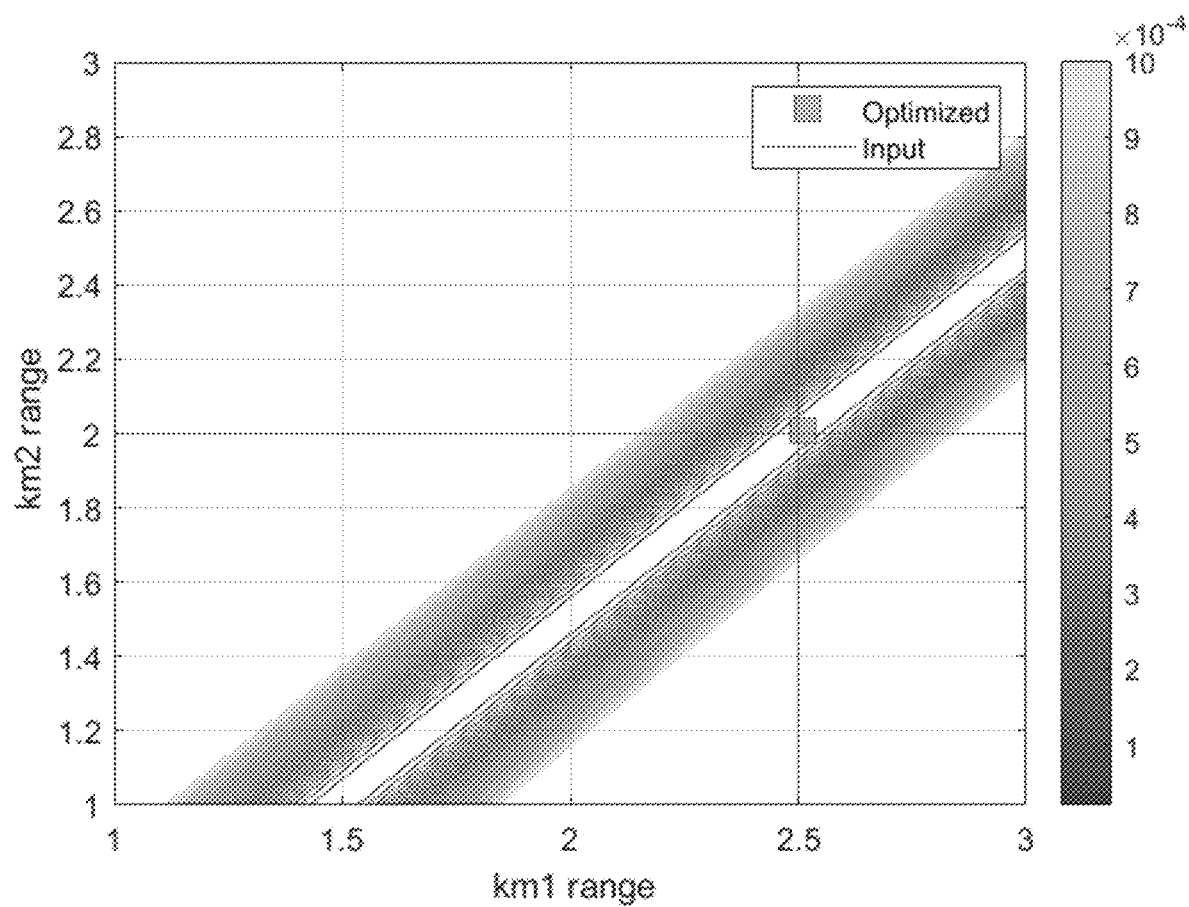
FIG. 18 is a graph that shows an example of an Error function based on equating mass flows measured at two frequencies.

Referring to FIG. 9 an example Coriolis meter 300 is shown with a number of strain based sensors 316 arrayed along a flow tube 312. One skilled in the art understands that the example may include pick-off coils and an exciter as necessary to generate and measure the natural frequency of the vibrations and twist of the vibrating flow tube may also be installed on the example Coriolis meter.

While example embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A Coriolis flowmeter comprising:
at least one flow tube configured to convey a process-fluid there through;
a drive system configured to vibrate the at least one flow tube at a first natural frequency and a second natural frequency;
electronics configured to determine a first measured process fluid density using the first natural frequency and a second measured process fluid density using the second natural frequency;
a plurality of sensors positioned proximate the at least one flow tube configured to measure a speed of sound of the process fluid;
an error model configured to use the speed of sound and the first measured process fluid density and the second measured process fluid density to quantify at least one effect of decoupling on the first measured process fluid density and to quantify at least one effect of decoupling on the second measured process fluid density;
the electronics configured to determine a corrected density of the process fluid in real time; and
a reporting device to report the corrected density of the process fluid.

2. The Coriolis flowmeter of claim 1 wherein the electronics are further configured to determine a liquid phase density from the corrected process fluid density.

3. The Coriolis flowmeter of claim 2 wherein the electronics are further configured to:
determine a measured mass flow of the process fluid from at least one of the first natural frequency and the second natural frequency;
determine a mass flow error using at least one of the at least one effect of decoupling on the first measured process fluid density and the at least one effect of decoupling on the second measured process fluid density;
determine a corrected mass flow of the process fluid using the mass flow error and the measured mass flow of the process fluid; and
the reporting device further configured to report the corrected mass flow of the process fluid.

4. The Coriolis flowmeter of claim 3 wherein the at least one effect of decoupling on the first measured process fluid density and the at least one effect of decoupling on the second measured process fluid density comprises a mass decoupling parameter.

5. The Coriolis flowmeter of claim 4 wherein said array of sensors responsive to pressure variations are strain-based sensors.

6. The Coriolis flowmeter of claim 1 wherein the electronics are further configured to determine a gas void fraction of the process fluid using the speed of sound of the process fluid.

7. The Coriolis flowmeter of claim 1 wherein the at least one effect of decoupling on the first measured process fluid density and the at least one effect of decoupling on the second measured process fluid density comprises a density decoupling parameter.

8. The Coriolis flowmeter of claim 1 wherein the system for measuring the sound speed of said process-fluid further comprises:
at least one strain based sensor engaged with at least one conduit; and
said at least one strain based sensor is electronically coupled with a central processor.

9. The Coriolis flowmeter of claim 1 wherein the system for measuring the vibration characteristics of said at least one conduit further comprises:
at least one pick-off coil responsive to the vibration at least one conduit; and
said at least one pick-off coil is electronically coupled with a central processor.

10. The Coriolis flowmeter of claim 1 wherein a central processor interprets said sound speed and vibrational characteristics of said at least one conduit vibrating at, at least two vibration frequencies, to provide a measurement of the process-fluid density.

11. The Coriolis flowmeter of claim 1 wherein a central processor interprets said sound speed and vibrational characteristics of said at least one conduit vibrating at, at least two vibration frequencies, to provide a measurement of the process-fluid mass flow.

12. The Coriolis flowmeter of claim 1 wherein said system that measures process-fluid sound speed is an array of sensors responsive the pressure variations within the process-fluid deployed on a conduit other than said at least one conduit.

13. The Coriolis flowmeter of claim 1 wherein said system that measures process-fluid sound speed determines a measure of gas void fraction of the process-fluid; and said system determines a reduced vibration frequency of more than one of the vibration frequencies of said at least one conduit.

14. The Coriolis flowmeter of claim 1 wherein said system that measures process-fluid sound speed determines a more than one reduced frequency of vibration of said at least one conduit.

15. A method for optimizing a process parameter of the Coriolis meter of claim 1 comprising:
vibrating said at least one conduit at two or more frequencies; and
said two or more frequencies being low or known reduced frequencies; and
providing homogeneous flows through said at least one conduit; and
measuring said process parameter at said two or more frequencies; and
calibrating said Coriolis meter to operate on the effects of process-fluid variability; and
measuring a process fluid sound speed; and
calibrating said measurement of a process parameter interpreted by said sound speed, wherein
an optimized process parameter is determined.

16. The method of claim 15 wherein:
said process parameter is the density of said process-fluid.

17. The method of claim 15 wherein:
said process parameter is the mass flow of said homogeneous flow.

18. The method of claim 15 wherein:
the effects of process-fluid variability is fluid inhomogeneity and/or changes in fluid compressibility.

19. The method of claim 15 wherein calibrating said Coriolis meter to measure the effects of process-fluid variability further comprises the steps of:
  correcting measured process parameters; and
  minimizing the difference between corrected process parameters.

20. A flow metering system comprising:
  a process-fluid in one or more conduits;
  actuator(s) for vibrating said one or more conduits;
  a sensor engaged with said one or more conduits for determining a process-fluid gas void fraction and a reduced frequency;
  a model for interpreting process-fluid mass flow rate and/or density by the vibrational characteristics of said one or more conduits;
  a calibration of said vibrational characteristics that is applicable for homogeneous flows at a known or sufficiently low reduced frequency;
  a model to correct interpreted process-fluid mass flow rate and/or density based on said calibration, applicable for homogeneous flows at a known or sufficiently low reduced frequency; and
  wherein a plurality of correction terms for a plurality of effects of decoupling are determined substantially as a function of the process-fluid gas void fraction and the plurality of correction terms for a plurality of effects of compressibility are determined substantially as a function of the reduced frequency.

21. The system of claim 20, wherein said sensor is an array of strain-based sensors.

* * * * *